United States Patent
Trillo Vargas et al.

(10) Patent No.: US 10,977,406 B1
(45) Date of Patent: Apr. 13, 2021

(54) ANALYSIS OF ELECTRICAL CIRCUIT SCHEMATICS

(71) Applicant: International Business Machines Corporation, Armonk, NY (US)

(72) Inventors: Jesus Gabriel Trillo Vargas, Guadalajara (MX); Jose de Jesus Jimenez Gonzalez, Guadalajara (MX); Addis Armenta Lopez, Tlajomulco de Zuniga (MX); Alejandro Moreno Lopez, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/919,146

(22) Filed: Jul. 2, 2020

(51) Int. Cl.
    *G06F 30/39* (2020.01)
    *G06F 30/20* (2020.01)
    *G06F 111/12* (2020.01)

(52) U.S. Cl.
    CPC .............. *G06F 30/39* (2020.01); *G06F 30/20* (2020.01); *G06F 2111/12* (2020.01)

(58) Field of Classification Search
    CPC ...... G06F 30/39; G06F 30/20; G06F 2111/12; G06F 30/27; G06N 20/00; G06N 3/02; G06N 3/08
    See application file for complete search history.

(56) References Cited

U.S. PATENT DOCUMENTS

| | | | |
|---|---|---|---|
| 5,249,133 A | 9/1993 | Batra | |
| 6,009,251 A | 12/1999 | Ho | |
| 6,606,731 B1 * | 8/2003 | Baum | G06K 9/00476 716/103 |
| 6,735,748 B1 | 5/2004 | Teig | |
| 7,401,291 B2 | 7/2008 | Ramaley | |
| 8,434,037 B2 * | 4/2013 | Krishnan | G06F 30/30 716/107 |
| 9,165,100 B2 | 10/2015 | Begur | |
| 9,256,706 B2 * | 2/2016 | Chen | G06F 30/392 |
| 9,984,133 B2 * | 5/2018 | Cervelli | G06F 16/24575 |
| 10,657,303 B2 * | 5/2020 | Lin | G06F 30/327 |
| 2007/0011632 A1 * | 1/2007 | Yang | G06F 30/33 716/103 |

(Continued)

FOREIGN PATENT DOCUMENTS

CN          104091161 A     10/2014

*Primary Examiner* — Nha T Nguyen
(74) *Attorney, Agent, or Firm* — Brian M. Restauro (57) ABSTRACT

A schematic diagram of an electronic circuit with an unknown function is received. In response to determining that a node equation list associated with the received schematic does not meet a first threshold similarity requirement to a stored node equation list in a database of schematic diagrams of electronic circuits, a main component list associated with the received schematic is created. Each schematic diagram stored in the database of schematic diagrams has a known function, includes an associated node equation list, and includes an associated main component list. In response to determining that the created main component list meets a second threshold requirement for similarity to a stored main component list from the database, a node equation list associated with the stored main component list is retrieved. A function of the received schematic is suggested based on a function of the retrieved node equation list.

20 Claims, 6 Drawing Sheets

(56) References Cited

U.S. PATENT DOCUMENTS

| | | | |
|---|---|---|---|
| 2007/0256037 A1* | 11/2007 | Zavadsky | G06F 30/30 716/103 |
| 2008/0234986 A1* | 9/2008 | Chen | G06F 30/30 703/1 |
| 2008/0282212 A1* | 11/2008 | Dennison | G06F 30/30 716/122 |
| 2013/0024827 A1 | 1/2013 | McIlrath | |
| 2019/0080164 A1* | 3/2019 | Duke | G06K 9/00456 |

* cited by examiner

310 — NODE EQUATION LIST

N1=LDR1(N2) + R2(N4) + IC1(N2N3N6N7) + D1(N9) + RLY1(N9) + 12V IN
N2=LDR1(N1) + R1(N3) + IC1(N1N3N6N7)
N3=R1(N2) + R3(N5) + IC1(N1N2N6N7) + R5(N8) + C1(N8) + Q1(N8N9) + GND
N4=R2(N1) + P1(N5N6)
N5=R3(N3) + P1(N4N6)
N6=P1(N4N5) + IC1(N1N2N3N7)
N7=R4(N8) + IC1(N1N2N3N6)
N8=R4(N7) + R5(N3) + C1(N3) + Q1(N3N9)
N9=Q1(N3N8) + D1(N1) + RLY1(N1)

315 — MAIN COMPONENT LIST

| COMPONENTS | UNIVERSAL KEY WORD |
|---|---|
| GL5506 | PHOTORESISTOR |
| LM741 | OPERATIONAL AMPLIFIER |
| 1N4148 | SIGNAL DIODE |
| NTE128 | BIPOLAR TRANSISTOR |
| SRD-12VDC-SL-C | RELAY RESISTOR |

330 — NODE EQUATION LIST

N1=NTC(N2) + R2(N4) + IC1(N2N3N6N7) + D1(N9) + RLY1(N9) + 12V IN
N2=NTC(N1) + R1(N3) + IC1(N1N3N6N7)
N3=R1(N2) + R3(N5) + IC1(N1N2N6N7) + R5(N8) + C1(N8) + Q1(N8N9) + GND
N4=R2(N1) + P1(N5N6)
N5=R3(N3) + P1(N4N6)
N6=P1(N4N5) + IC1(N1N2N3N7)
N7=R4(N8) + IC1(N1N2N3N6)
N8=R4(N7) + R5(N3) + C1(N3) + Q1(N3N9)
N9=Q1(N3N8) + D1(N1) + RLY1(N1)

335 — MAIN COMPONENT LIST

| COMPONENTS | UNIVERSAL KEY WORD |
|---|---|
| NTC | THERMISTORS |
| LM741 | OPERATIONAL AMPLIFIER |
| 1N4148 | SIGNAL DIODE |
| NTE128 | BIPOLAR TRANSISTOR |
| SRD-12VDC-SL-C | RELAY RESISTOR |

ANALYSIS OF ELECTRICAL CIRCUIT SCHEMATICS

BACKGROUND

The present invention relates generally to the field of electrical circuit schematics, and more particularly to analyzing electrical circuit schematics to determine their function.

An electrical circuit schematic is a logical representation of the physical connections and layout of an electric circuit. A well-documented schematic outlines the functionality of an electrical circuit and provides the basis for assembly and troubleshooting of a system. An electrical schematic can contain few or many symbols (a symbol is a pictorial representation of an electrical component) and connections between symbols, and is normally read from left to right, top to bottom. An electrical circuit schematic is one of the three common ways to show an electrical circuit, the other two being a wiring diagram and a pictorial diagram.

SUMMARY OF THE INVENTION

Embodiments of the present invention include an approach for analyzing electrical circuit schematics to determine their function. In one embodiment, a schematic diagram of an electronic circuit with an unknown function is received. In response to determining that a node equation list associated with the received schematic does not meet a first threshold similarity requirement to a stored node equation list in a database of schematic diagrams of electronic circuits, a main component list associated with the received schematic is created. Each schematic diagram stored in the database of schematic diagrams has a known function, includes an associated node equation list, and includes an associated main component list. In response to determining that the created main component list meets a second threshold requirement for similarity to a stored main component list from the database of schematic diagrams of electronic circuits, a node equation list associated with the stored main component list is retrieved. A function of the received schematic is suggested based on a function of the retrieved node equation list.

DETAILED DESCRIPTION

Embodiments of the present invention recognize that analyzing electrical circuit schematics (also known as diagrams) is a slow and complicated process. Circuit analysis is done manually, or semi-automatically, and is subject to human visual errors. A person performing an analysis of complex schematics requires a high level of skill and attention to detail, and interpretation of the results of the analysis is also complicated resulting in the potential for additional human error. In some embodiments of the present invention, improvements to circuit design are made by analyzing a plurality of schematics with known functions and recommending design changes to a schematic with an unknown function to improve its efficiency and operation.

Embodiments of the present invention recognize that there may be a method, computer program product, and computer system for analyzing electrical circuit schematics using a cognitive system to determine their function. In an embodiment, the cognitive system receives an unknown schematic and creates a Node Equation List (NEL). Based on the created NEL, a database is searched for a comparable NEL (within a threshold). If a comparable NEL is not found, a Main Component List (MEL) is created from the received schematic. Again, based on the created MCL, the database is searched for a comparable MCL (within a threshold). If a comparable MCL is not found, the received schematic is determined to be new.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
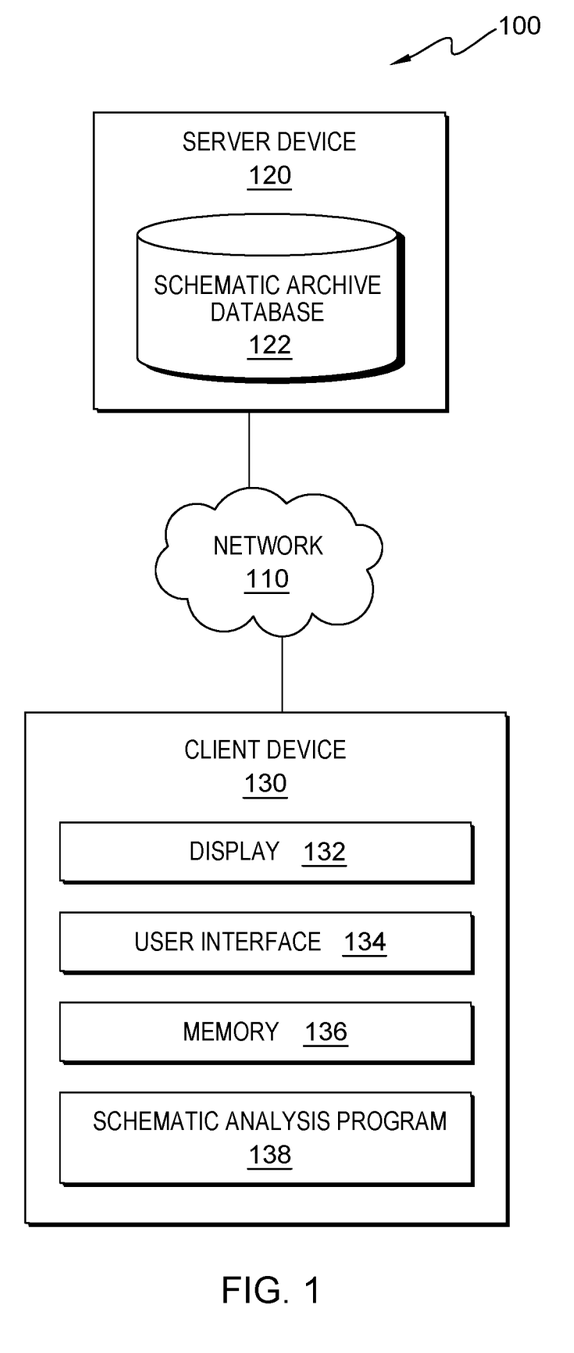
FIG. 1 depicts a functional block diagram illustrating a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120 and client device 130, interconnected by network 110. In example embodiments, computing environment 100 includes other computing devices (not shown in FIG. 1) such as smartwatches and other wearable technology, cell phones, smartphones, phablets, tablet computers, additional laptop computers, additional desktop computers, other computer servers, or any other computer system known in the art, interconnected with server device 120 and client device 130 over network 110

In embodiments of the present invention, server device 120 and client device 130 are connected to network 110, which enables server device 120 and client device 130 to access other computing devices and/or data not directly stored on server device 120 and client device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between server device 120 and client device 130, and any other computing devices (not shown in FIG. 1) connected to network 110, in accordance with embodiments of the present invention. In an embodiment, data received by another computing device (not shown in FIG. 1) in computing environment 100 is communicated to server device 120 and client device 130 via network 110.

In an embodiment, server device 120 is one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 120 can be a standalone computing device, a management server, a web server, a mobile computing device, or any other electronic device or computing system capable of receiving, transmitting, and processing data. In other embodiments, server device 120 can represent computing systems utilizing multiple computers as a server system, such as in a cloud computing environment. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. In an embodiment, computing environment 100 includes any number of server device 120. Server device 120 may include internal and external hardware components as depicted and described in further detail with respect to FIG. 4, in accordance with embodiments of the present invention. In an embodiment, server device 120 includes schematic archive database (SADB) 122.

According to an embodiment, SADB 122 is a collection of information that is organized in a memory so that it can be easily accessed, managed, and updated. SADB 122 contains an aggregation of previously analyzed electrical circuit schematics in which their functions have been determined and documented. In an embodiment, SADB 122 may be a relational database or a graph database. According to one embodiment of the present invention, there can be any number of SADB 122 in computing environment 100. In one embodiment of the present invention, SADB 122 includes any number of electrical circuit schematics with known functions and further includes the node equation lists and main component lists associated with the any number of electrical circuit diagrams.

In an embodiment, client device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 130 can be a standalone computing device, a management server, a web server, a mobile computing device, or any other electronic device or computing system capable of receiving, transmitting, and processing data. In other embodiments, client device 130 can represent computing systems utilizing multiple computers as a server system, such as in a cloud computing environment. In certain embodiments, client device 130 represents a computer system utilizing clustered computers and components (e.g., database server computers, application server computers, etc.) that act as a single pool of seamless resources when accessed by elements of computing environment 100. In general, client device 130 is representative of any electronic device or combination of electronic devices capable of executing computer readable program instructions. In an embodiment, computing environment 100 includes any number of client device 130. Client device 130 may include internal and external hardware components as depicted and described in further detail with respect to FIG. 4, in accordance with embodiments of the present invention. According to an embodiment of the present invention, client device 130 includes display 132, user interface 134, memory 136, and schematic analysis program 138.

According to an embodiment, display 132 is an electronic visual device for a desktop computer, laptop computer, tablet computer, smartphone, smart-watch, and the like. Display 132 may include a touchscreen which is an input device layered on top of the display for allowing a user to control an electronic device via simple or multi-touch gestures by touching display 132 with a special stylus and/or one or more fingers. Display 132 displays open programs and applications, allowing a user of client device 130 to interact with the open programs and applications via a keyboard, mouse, and buttons (not shown in FIG. 1). Display 132 may be a thin film transistor liquid crystal display (TFT-LCD), a flat panel LED (light emitting diode) display, a cathode ray tube (CRT), or any type of display device known in the art or developed in the future. Display 132 may be connected to client device 130 via VGA (video graphics array), DVI (digital video interface), HDMI (High Definition Multi-Media Interface), or any other connection type known in the art or developed in the future.

In an embodiment, user interface 134 provides an interface between a user of client device 130 and schematic analysis program 138. User interface 134 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 134 may also be mobile application software that provides an interface between client device 130 and schematic analysis program 138. Mobile application software, or an "app," is a computer program designed to run on smartphones, tablet computers and other mobile devices. User interface 134 enables a user of client device 130 to interact with schematic analysis program 138, server device 120, and any other computing devices not shown in FIG. 1.

According to an embodiment, memory 136 is storage that is written to and/or read by schematic analysis program 138, and any other programs and applications on client device 130. In one embodiment, memory 136 resides on client device 130. In other embodiments, memory 136 resides on server device 120 or on any other device (not shown in FIG.

1) in computing environment 100, in cloud storage, or on another computing device accessible via network 110. In yet another embodiment, memory 136 represents multiple storage devices within client device 130. Memory 136 may be implemented using any volatile or non-volatile storage media for storing information, as known in the art. For example, memory 136 may be implemented with a tape library, optical library, one or more independent hard disk drives, multiple hard disk drives in a redundant array of independent disks (RAID), solid-state drives (SSD), or random-access memory (RAM). Similarly, memory 136 may be implemented with any suitable storage architecture known in the art, such as a relational database, an object-oriented database, or one or more tables. In an embodiment of the present invention, schematic analysis program 138, and any other programs and applications (not shown in FIG. 1) operating on client device 130 and server device 120 may store, read, modify, or write data to memory 136. In an embodiment of the present invention, data stored to memory 136 includes, but is not limited to, data stored by schematic analysis program 138 such as Node Equation Lists, Main Component Lists, and electrical circuit schematics which have known functions.

According to embodiments of the present invention, schematic analysis program 138 can be a program, a subprogram of a larger program, an application, a plurality of applications, or mobile application software, which functions to analyze electrical circuit schematics to determine their function. A program is a sequence of instructions written to perform a specific task. In an embodiment, schematic analysis program 138 runs independently. In other embodiments, schematic analysis program 138 depends on system software and/or other programs (not shown in FIG. 1) to execute. According to an embodiment, schematic analysis program 138 is a cognitive system based on artificial intelligence utilizing machine learning and deep learning that analyzes electrical circuit schematics to determine their functions. In one embodiment, schematic analysis program 138 functions as a stand-alone program residing on client device 130. In another embodiment, schematic analysis program 138 works in conjunction with other programs, applications, etc., found in computing environment 100. In yet another embodiment, schematic analysis program 138 resides on any computing device within computing environment 100, for example, server device 120. In yet another embodiment, schematic analysis program 138 resides on other computing devices (not shown in FIG. 1) in computing environment 100, which are interconnected to client device 130 via network 110.

According to an embodiment, schematic analysis program 138 receives an electrical circuit schematic with an unknown function from a user. In the embodiment, schematic analysis program 138 creates a Node Equation List (NEL) from the received schematic. Further in the embodiment, schematic analysis program 138 compares the created NEL to a plurality of NELs stored to, and retrieved from, a database. Further yet in the embodiment, if a match between the created NEL and one or more retrieved NELs is not determined (within a threshold) by schematic analysis program 138, schematic analysis program 138 creates a Main Component List (MCL) for the received schematic. Further yet in the embodiment, schematic analysis program 138 compares the created MCL to a plurality MCLs stored to and retrieved from the database. Further yet in the embodiment, if a match of the created MCL and one or more retrieved MCLs is not determined (within a threshold) by schematic analysis program 138, schematic analysis program 138 labels the received schematic as "new", and further stores the new schematic to a database.

Figure 2:
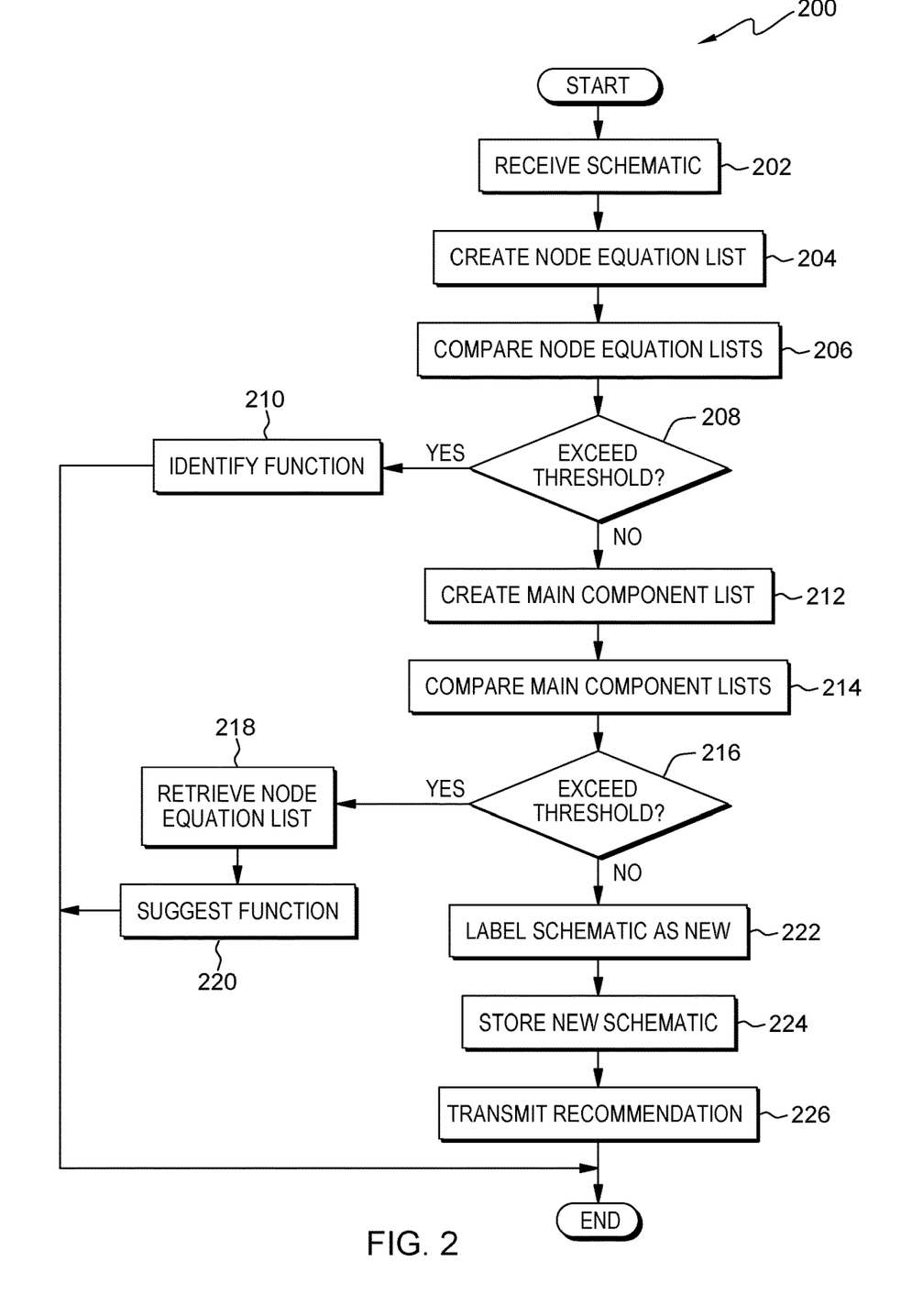
FIG. 2 is a flowchart depicting operational steps of a schematic analysis program providing for the analysis of electrical circuit schematics, on a computing device within the computing environment of FIG. 1, in accordance with an embodiment of the present invention.

FIG. 2 is a flowchart of workflow 200 depicting a method for analyzing electrical circuit schematics using a cognitive system to determine their function. In one embodiment, the method of workflow 200 is performed by schematic analysis program 138. In an alternative embodiment, the method of workflow 200 is performed by any other program working with schematic analysis program 138. In an embodiment, a user of client device 130 invokes workflow 200 upon loading an electrical circuit schematic with an unknown function to schematic analysis program 138. In an alternative embodiment, a user of client device 130 invokes workflow 200 upon accessing schematic archive database 122 on server device 120.

In an embodiment, schematic analysis program 138 receives a schematic (step 202). In other words, schematic analysis program 138 receives from a user an electrical circuit schematic (i.e., schematic) with an unknown function. Additionally, the user also transmits any associated information known about the schematic, including, but not limited to, a name for the schematic, a part number of the schematic, component placement data, drill data, mask data, electrical test data, a netlist of the schematic, and any other design/manufacturing data associated with the schematic. According to an embodiment, the user transmits the information and the schematic which is received by schematic analysis program 138. According to another embodiment, schematic analysis program 138 receives the schematic and the associated information by retrieving said schematic from a repository such as a database. In an embodiment, schematic analysis program 138 receives a schematic with an unknown function and associated information concerning the schematic from a user of client device 130; said schematic and information is stored to memory 136. For example, Joe loads a schematic with an unknown function to a program on a company server.

According to an embodiment of the present invention, schematic analysis program 138 creates Node Equation List (step 204). In other words, responsive to receiving the schematic, schematic analysis program 138 creates a Node Equation List (NEL) of the schematic. In an embodiment, schematic analysis program 138 detects and identifies all, or a threshold proportion of, the nodes and components in the received schematic via, for example, object recognition techniques. Object recognition is a computer technology related to computer vision and image processing that deals with detecting instances of semantic objects. Methods for object detection fall into either machine learning-based approaches or deep learning-based approaches. For machine learning approaches, it becomes necessary to first define features using an available method, then using a technique such as support vector machine (SVM) to do the classification. On the other hand, deep learning techniques are able to do end-to-end object detection without specifically defining features and are typically based on convolutional neural networks (CNN). Based on the node/component identification, schematic analysis program 138 generates a data structure of the schematic which is comprised of a NEL for the schematic. The NEL contains a set of Node Function Equations (NFEs), one NFE for each identified node in the schematic. Each NFE (i) contains information descriptive of one node of the subject schematic and (ii) represents all components connected in common at each node in said schematic. Analyzing the NFEs improves the analysis efficiency of the computer analysis due to the descriptive nature of the NFEs compared to analyzing the entirety of the schematic. Together, a complete set of NFEs, making up the NEL, describes the schematic in a machine-readable form and format. In another embodiment, schematic analysis program 138 creates the NEL for the schematic using any known NEL creation method. According to an embodiment, schematic analysis program 138 creates a NEL for the received schematic. For example, a program on the company server creates a NEL associated with the schematic loaded to the server by Joe.

In an embodiment, schematic analysis program 138 compares NELs (step 206). In other words, schematic analysis program 138 compares the NEL created for the schematic with other NELs to identify schematics with equivalent NELs, or schematics with NELs that are similar within a threshold to the created NEL. According to an embodiment, schematic analysis program 138 retrieves available NELs associated with schematics with known functions to compare with the created NEL. For each of the retrieved schematics, the retrieved NEL is comprised of the individual NFEs for the entire schematic (e.g., the NEL for schematic 'A' is comprised of nine NFEs). The comparison of NELs is a simple comparison of the individual NFEs (i.e., each of $NFE_1$ through $NFE_9$, comprising the NEL for schematic 'A', are compared to the nine NFEs that comprise the NEL of a first retrieved schematic to determine whether any of the NFEs are equivalent). Please refer to the discussion of FIGS. 3A-3C for a more detailed discussion of comparing NELs. Thus, schematic analysis program 138 selects a first NEL for comparison. Schematic analysis program 138 compares each NFE in the created NEL to each NFE in the selected NEL for the first schematic and determines the number of NFEs that match. This process is repeated by schematic analysis program 138 until all of the available NELs in the database have been compared with the created NEL associated with the schematic. Based on the comparison, schematic analysis program 138 identifies the closest matching NELs (please see the example below). In an embodiment, schematic analysis program 138 compares the NEL of the received schematic to available NELs, retrieved over network 110, from schematic archive database (SADB) 122 on server device 120. For example, the program on the server compares the NEL for the schematic loaded by Joe to available NELs for schematics with known functions; the available NELs being stored to a memory on the server.

Consider an example of schematic "A" with an NEL comprised of nine NFEs (i.e., $A/NFE_1$-$A/NFE_9$). Schematic analysis program 138 will search an available repository of schematics with known functions and associated NELs to identify other NELs comprised of nine NFEs. In the example, two schematics ('a' and 'b'), and their associated NELs, are identified as each having nine NFEs (i.e., for schematic 'a', $a/NFE_1$-$a/NFE_9$ and for schematic $b/NFE_1$-$b/NFE_9$). Schematic analysis program 138 will compare the nine NFEs comprising the NEL of schematic "A" with the nine NFEs comprising the NEL of schematic 'a'; in said comparison, three NFEs match (i.e., three matching NFEs out of nine total NFEs (e.g., $A/NFE_2$, $A/NFE_4$, and $A/NFE_6$ match $a/NFE_1$, $a/NFE_3$, and $a/NFE_5$) for a "33%" match). Schematic analysis program 138 also compares the nine NFEs comprising the NEL of schematic "A" with the nine NFEs comprising the NEL of schematic 'b'; in said comparison, six NFEs match (i.e., six matching NFEs out of nine total NFEs (e.g., $A/NFE_2$, $A/NFE_4$, $A/NFE_6$, $A/NFE_7$, $A/NFE_8$, and $A/NFE_9$ match $b/NFE_1$, $b/NFE_3$, $b/NFE_5$, $b/NFE_6$, $b/NFE_7$, and $b/NFE_8$) for a "67%" match). Therefore, in this example, schematic 'b' is the closer match to schematic "A".

According to an embodiment of the present invention, schematic analysis program 138 determines whether NELs match within a threshold (decision step 208). In other words, based on the comparison of the created NEL from the schematic with an unknown function to other available NELs of schematics with known functions, schematic analysis program 138 determines whether any of the matched NELs meet or exceed a threshold value. In an embodiment, the threshold value is defined by a user. In another embodiment, the threshold value is determined by schematic analysis program 138 based on historical comparisons of NELs. According to one embodiment (decision step 208, YES branch), schematic analysis program 138 determines that the match between the compared NELs exceeds the threshold value; therefore, schematic analysis program 138 proceeds to step 210 to identify the function of the schematic. According to the embodiment (decision step 208, NO branch), schematic analysis program 138 determines that the match between the compared NELs does not exceed the threshold value; therefore, schematic analysis program 138 proceeds to step 212 to create a main component list.

Consider again the above example of schematics "A", 'a', and 'b'. Using an example threshold value of eighty percent ("80%"), schematic analysis program 138 determines that the best match of "67%" between schematics "A" and 'b' does not exceed the "80%" threshold; thus, the function of schematic "A" cannot yet be determined and schematic analysis program 138 proceeds to determine the main component list for schematic "A". Had there been another schematic 'c' with an "85%" match to schematic "A" (which would have exceeded the "80%" threshold), schematic analysis program 138 could have identified the function of schematic "A" based on the function of schematic 'c' (as discussed below).

According to some embodiments, schematic analysis program 138 identifies function (step 210). In other words, responsive to determining that NELs match within a threshold, schematic analysis program 138 identifies the function of the schematic based on the match. In an embodiment, schematic analysis program 138 retrieves the information associated with the schematic that exceeded the threshold to identify the function of said schematic. Schematic analysis program 138 assigns the identified function to the schematic with the formerly unknown function and stores the schematic, the function, the created NEL, and the information received from the user about the schematic to a database. According to an embodiment of the present invention, schematic analysis program 138 identifies the function of the unknown schematic based on exceeding the threshold value of the NEL match between the unknown schematic and the schematic with the closest NEL match. For example, the program on the server identifies the function of the schematic loaded by Joe based on an NEL match of "95%" between said schematic and the compared NEL ("95%" exceeding an "80%" threshold value currently being used by the server program).

According to an embodiment of the present invention, schematic analysis program 138 creates Main Component List (step 212). In other words, responsive to not finding a NEL match within a threshold, schematic analysis program 138 determines a Main Component List (MCL) for the received schematic. The MCL is a listing of primary (i.e., components other than resistors, capacitors, etc.) components identified in the schematic. In one embodiment, schematic analysis program 138 determines the MCL for the schematic as a function of determining the NEL (described above). In another embodiment, schematic analysis program 138 uses object recognition to create the MCL for the schematic. Machine learning, as used in this context of object recognition, is a cognitive model trained with a corpus of electrical components with corresponding names, functions, symbols, shapes, sizes, colors, markings, etc., to "teach" the model to identify components used in electrical schematics. The object recognition model is also able to "read" designations on the schematic that are associated with various symbols and other markings to aid the model in identifying a plurality of objects included in the schematic. According to an embodiment, schematic analysis program 138 creates an MCL for the received schematic. For example, the program on the server creates an MCL for the schematic loaded by Joe.

In an embodiment, schematic analysis program 138 compares Main Component Lists (step 214). In other words, schematic analysis program 138 compares the MCL created for the schematic with other MCLs to identify schematics with equivalent MCLs, or schematics with MCLs that are similar within a threshold to the created MCL. According to an embodiment, schematic analysis program 138 retrieves available MCLs associated with schematics with known functions to compare to the created MCL. The comparison of MCLs is a simple comparison of the identified components included in the MCL between the created MCL for the schematic and the retrieved MCLs. Please refer to the discussion of FIGS. 3A-3C for a more detailed discussion of comparing MCLs. In an embodiment, the retrieved MCLs are retrieved from an accessible database. The process is repeated by schematic analysis program 138 until all of the available MCLs in the database have been compared with the created MCL associated with the schematic. Based on the comparison, schematic analysis program 138 identifies the closest match of MCLs (please see the example below). According to an embodiment of the invention, schematic analysis program 138 retrieves available MCLs from SADB 122 on server device 120 and compares said MCLs to the created MCL associated with the schematic. For example, the program on the server compares the MCL for the schematic loaded by Joe to available MCLs for schematics with known functions; the available MCLs being stored to a memory on the server.

Consider an example of schematic "A" with an MCL comprised of ten main components ($A/MC_1$-$A/MC_{10}$). Schematic analysis program 138 will search an available repository of schematics with known functions and associated MCLs to identify other MCLs with ten main components. In the example, assume only schematic 'x' is identified as having ten main components (i.e., $x/MC_1$-$x/MC_{10}$). Schematic analysis program 138 will compare each of the ten main components of schematic "A" to the ten main components of schematic 'x'; in said comparison, only six of the main components are common (i.e., match) between "A" and 'x' (e.g., $A/MC_2$, $A/MC_4$, $A/MC_5$, $A/MC_6$, $A/MC_8$, and $A/MC_{10}$ match $x/MC_1$, $x/MC_2$, $x/MC_3$, $x/MC_4$, $x/MC_5$, and $x/MC_6$). Thus, there is a "60%" match between the two schematics (i.e., six components out of the ten total components match).

According to an embodiment of the present invention, schematic analysis program 138 determines whether MCLs match within a threshold (decision step 216). In other words, based on the comparison of the created MCL from the schematic with an unknown function to other available MCLs of schematics with known functions, schematic analysis program 138 determines whether any of the matched MCLs meet or exceed a threshold value. In an embodiment, the threshold value is defined by a user. In another embodiment, the threshold value is determined by schematic analysis program 138 based on a historical comparison of MCLs. According to one embodiment (decision step 216, YES branch), schematic analysis program 138 determines that the match between the compared MCLs exceeds the threshold value; therefore, schematic analysis program 138 proceeds to step 218 to retrieve the NEL for the schematic associated with the match MCL. According to the embodiment (decision step 216, NO branch), schematic analysis program 138 determines that the match between the compared MCLs does not exceed the threshold value; therefore, schematic analysis program 138 proceeds to step 222 to label the schematic as new.

Consider again the above example of schematics "A" and 'x'. Using an example threshold value of eighty percent ("80%"), schematic analysis program 138 determines that the best match of "60%" between schematics "A" and 'x' does not exceed the "80%" threshold; thus, the function of schematic "A" cannot yet be determined. However, had the match in MCLs been nine components matched between the two schematics, there would have been a "90%" match (exceeding the "80%" threshold) and schematic analysis program 138 would have proceeded to retrieve the NEL associated with the matching schematic 'x'.

In an embodiment, schematic analysis program 138 retrieves NEL (step 218). In other words, responsive to determining that MCLs match within a threshold, schematic analysis program 138 retrieves the NEL for the schematic with the MCL that matched the MCL of the schematic with the unknown function within the threshold. In one embodiment, schematic analysis program 138 retrieves the NEL from the same database from which the MCL was retrieved. In another embodiment, schematic analysis program 138 retrieves the NEL from a different database. In yet another embodiment, schematic analysis program 138 creates the NEL for the schematic rather than retrieving the NEL. According to an embodiment of the present invention, schematic analysis program 138 retrieves the NEL associated with the MCL of the matched schematic from SADB 122 on server device 120 using network 110. For example, the program on the server retrieves the associated NEL for the schematic with the matching MCL from the memory on the server.

According to an embodiment, schematic analysis program 138 suggests function (step 220). In other words, based on the retrieved NEL and the threshold match of MCLs (i.e., comparable schematics previously identified (if available)), schematic analysis program 138 suggests an appropriate function for the received schematic with the unknown function. In one embodiment, schematic analysis program 138 suggests the same function for the received schematic as the schematic retrieved from the database of known schematics. For example, the same function is suggested if the difference in main components is a photodiode versus a sensor because the photodiode is a type of sensor. In another embodiment, schematic analysis program 138 suggests a different function for the received schematic based on the differences between the created NEL and MCL for the received schematic and the retrieved NEL and MCL for the schematic with the known function. In another example, if the difference between schematics is a temperature sensor in the schematic with the unknown function replacing a noise sensor in the schematic with the known function, the suggested function is temperature detector. According to an embodiment of the present invention, schematic analysis program 138 suggest the function for the received schematic based on the retrieved NEL and the associated MCL for the schematic with the known function. For example, the program on the company server suggests a function for the schematic loaded by Joe based on the retrieved NEL and the associated MCL for the schematic stored to the server memory.

In an embodiment, schematic analysis program 138 labels schematic as new (step 222). In other words, responsive to determining that there is not a match of MCLs within a threshold (as well as previously determining that there is not a match of NELs within a threshold), schematic analysis program 138 labels the received schematic as new with an unknown function. In an embodiment, as a part of the training for the cognitive system, a user can provide the function of the schematic when schematic analysis program 138 labels the received schematic as new with an unknown function. Alternatively, the user can leave the unknown label. This learning increases the repository of schematics with known functions stored to SADB 122. According to an embodiment, schematic analysis program 138 labels the schematic simply as "New Schematic". According to another embodiment, schematic analysis program 138 uses the information associated with the schematic as part of the labelling (e.g., for a schematic with a part number of "22G5739", schematic analysis program 138 labels the schematic as "22G5739_NEW"). According to yet another embodiment, schematic analysis program 138 uses any naming convention known in the art to label the schematic and includes the "NEW" designation as part of the naming convention. In an embodiment, schematic analysis program 138 labels the received schematic as "NEW SCHEMATIC 4.13.20", where the date of "4.13.20" is the date of the analysis by schematic analysis program 138. For example, the server program labels the schematic loaded by Joe as "47X69_New Schematic_Joe Smith".

According to an embodiment, schematic analysis program 138 stores new schematic (step 224). In other words, schematic analysis program 138 stores the received schematic according to how said schematic was previously labeled. In an embodiment, in addition to storing the new schematic labelled "new", schematic analysis program 138 stores (i) the information received from the user associated with the schematic; (ii) the created NEL for the schematic; (iii) the available schematics included in the NEL comparison; (iv) the created MCL for the schematic; and (v) the available schematics included in the MCL comparison. According to one embodiment, the schematic is stored by schematic analysis program 138 to a database of schematics such as SADB 122. According to another embodiment, the schematic is stored by schematic analysis program 138 to a directory of schematics with unknown function within the database of schematics. According to yet another embodiment, the schematic is stored by schematic analysis program 138 to a memory separate and distinct from the database of schematics, such as memory 136 on client device 130. In an embodiment, schematic analysis program 138 stores "NEW SCHEMATIC 4.13.20" and the information associated with said schematic to SADB 122 on server device 120 via network 110.

In one embodiment of the present invention, schematic analysis program 138 transmits a recommendation (step 226). In other words, based on storing the "new" schematic, schematic analysis program 138 transmits a recommendation to a user. According to an embodiment, schematic analysis program 138 transmits a recommendation to the user for improving the design and efficiency of the received schematic based on the closest compared NELs and MCLs of the schematics with known functions (said schematics retrieved from a database of schematics with known functions). In addition to improving the design efficiency, the recommendation to the user associated with the received schematic can resolve design errors in the schematic previously unknown to the user. The recommendation can be transmitted in any format used and known in the art (e.g., an e-mail message containing the recommendation transmitted to the user via an Internet connection). According to another embodiment, in addition to transmitting a recommendation, schematic analysis program 138 can create a new schematic data file which includes the recommended change to the received schematic. In one embodiment, schematic analysis program 138 creates the new schematic data file itself (e.g., changes a line in the data file to replace a first component with a second component). In another embodiment, schematic analysis program 138 can interface with another system, transmit instructions to said system which creates the new schematic data file. For example, a schematic analyzed by schematic analysis program 138 has five main components—"A1", "B2", "C3", "D4", and "E5". Following the analysis, schematic analysis program 138 can recommend to the user to replace "E5" with component "X99" because "X99" is a newer version of "E5" that provides the same function but consumes less energy. Thus, using "X99" improves the energy efficiency of the schematic resulting in an improved product for the user. According to an embodiment, schematic analysis program 138 transmits a recommendation to the user of client device 130 via displaying a message to the user in display 132 via user interface 134. For example, the program on the company server transmits an e-mail to Joe which includes the recommendation to substitute component "M1" with component "N2" to resolve an operability issue with the schematic loaded by Joe.

Figure 3A:
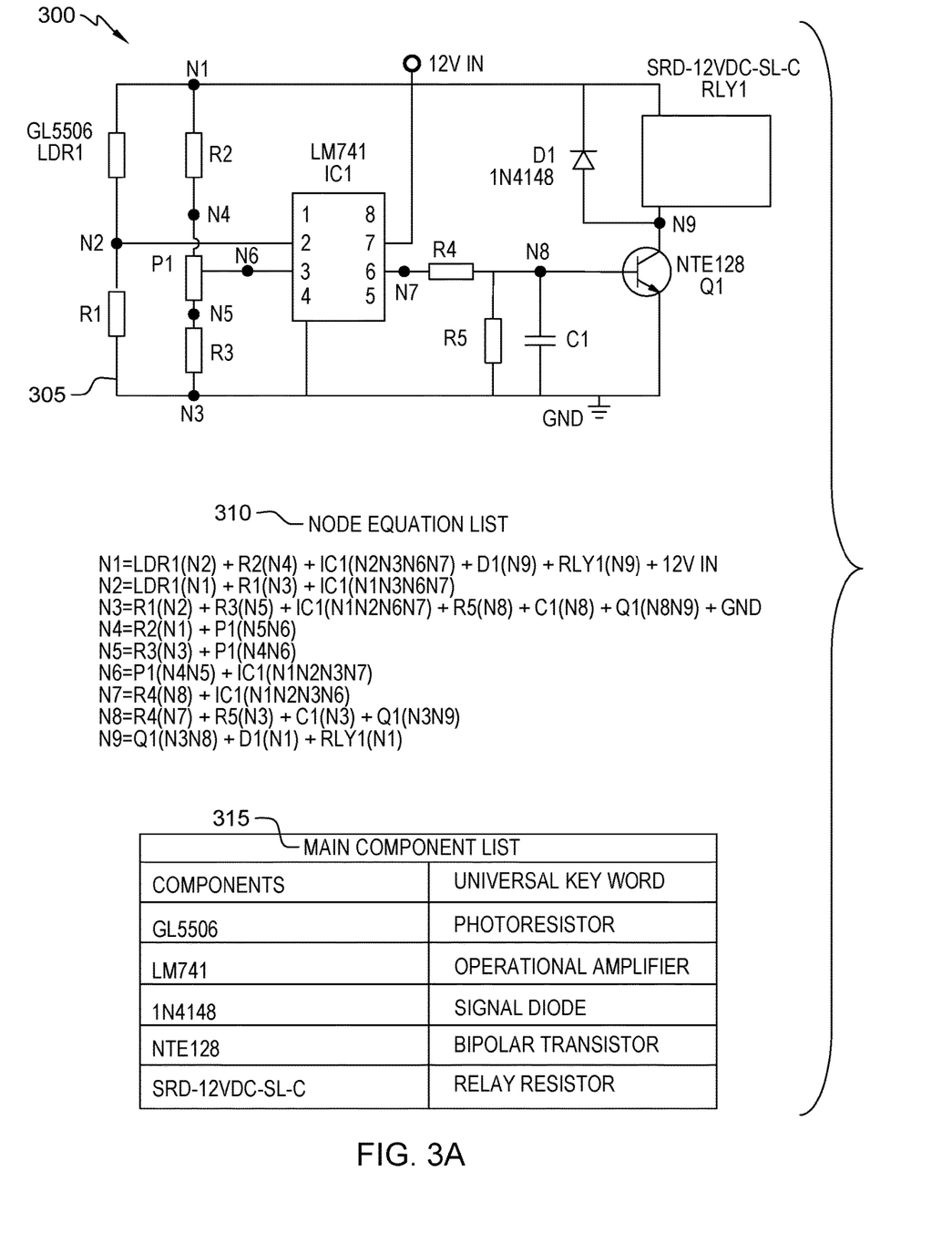
FIG. 3A depicts features of an exemplary example of a first electrical schematic, in accordance with an embodiment of the present invention.

FIG. 3A is an exemplary example 300 of a first electrical circuit schematic. FIG. 3A includes schematic 305, associated Node Equation List (NEL) 310, and associated Main Component List (MCL) 315. NEL 310 and MCL 315 are created for schematic 305 using the previously described methods. NEL 310 includes nine NFEs (node function equations); one example NFE from NEL 310 is "N4=R2(N1)+P1(N5N6)". MCL 315 includes five main components; one example component is "NTE128".

Figure 3B:
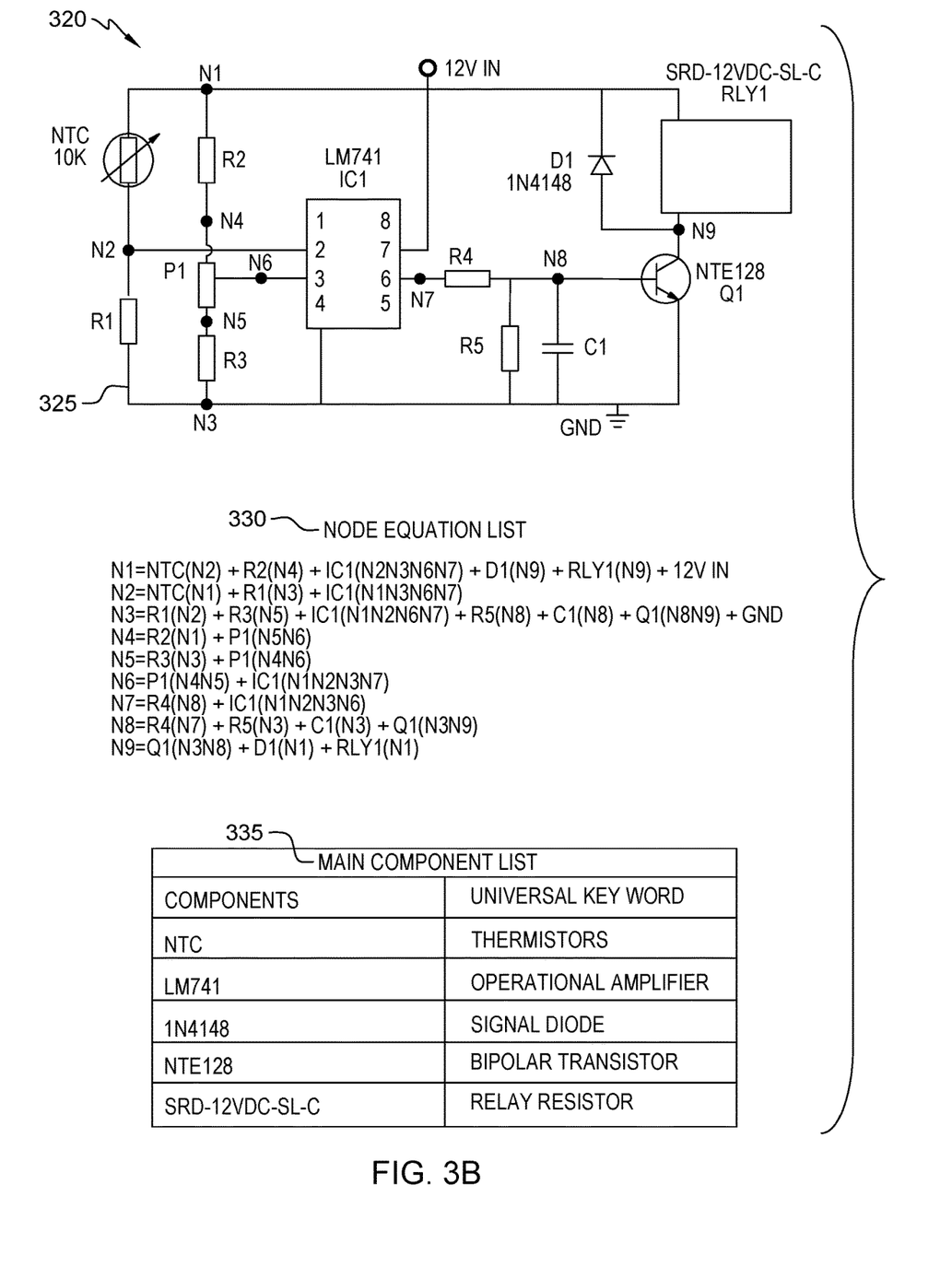
FIG. 3B depicts features of an exemplary example of a second electrical schematic, in accordance with an embodiment of the present invention.

FIG. 3B is an exemplary example 320 of a second electrical circuit schematic. FIG. 3B includes schematic 325, associated NEL 330, and associated MCL 335. NEL 330 and MCL 335 are created for schematic 325 using the previously described methods. Further, schematic 325, NEL 330, and MCL 335 have been stored to a database of schematics with known function (e.g., SADB 122 on server device 120 shown in FIG. 1). NEL 330 includes nine NFEs (Node Function Equations); one example NFE from NEL 330 is "N4=R2(N1)+P1(N5N6)" which is also included in NEL 310 for schematic 305 in FIG. 3A. MCL 335 includes five main components; one example component is "NTE128" which is also included in MCL 315 for schematic 305 in FIG. 3A.

A comparison of schematic 305 in FIG. 3A and schematic 325 in FIG. 3B shows that between the two schematics, the NELs have seven node equations in common (i.e., the node equations for Nodes "3" through "9") and two node equations that differ. The two differences can be seen in the node equations for Node "1" and Node "2" (i.e., "N1" and "N2") where schematic 305 in FIG. 3A includes component "LDR1" in both node equations while schematic 325 in FIG.

3B includes component "NTC" (instead of "LDR1") in both node equations. Thus, there is an NEL match of "77.7%" (i.e., seven node equations match out of the nine total node equations). Considering now the MCLs for the two schematics, the difference noted in the NELs is further highlighted when comparing the MCLs where "GL5506" (aka "LDR1") in the MCL for schematic 305 in FIG. 3A is replaced by "NTC" in the MCL for schematic 325 in FIG. 3B. Thus, there are four common main components between the two schematics and one unique component for each schematic yielding an MCL match of "80%" (i.e., four components match out of five total components).

Figure 3C:
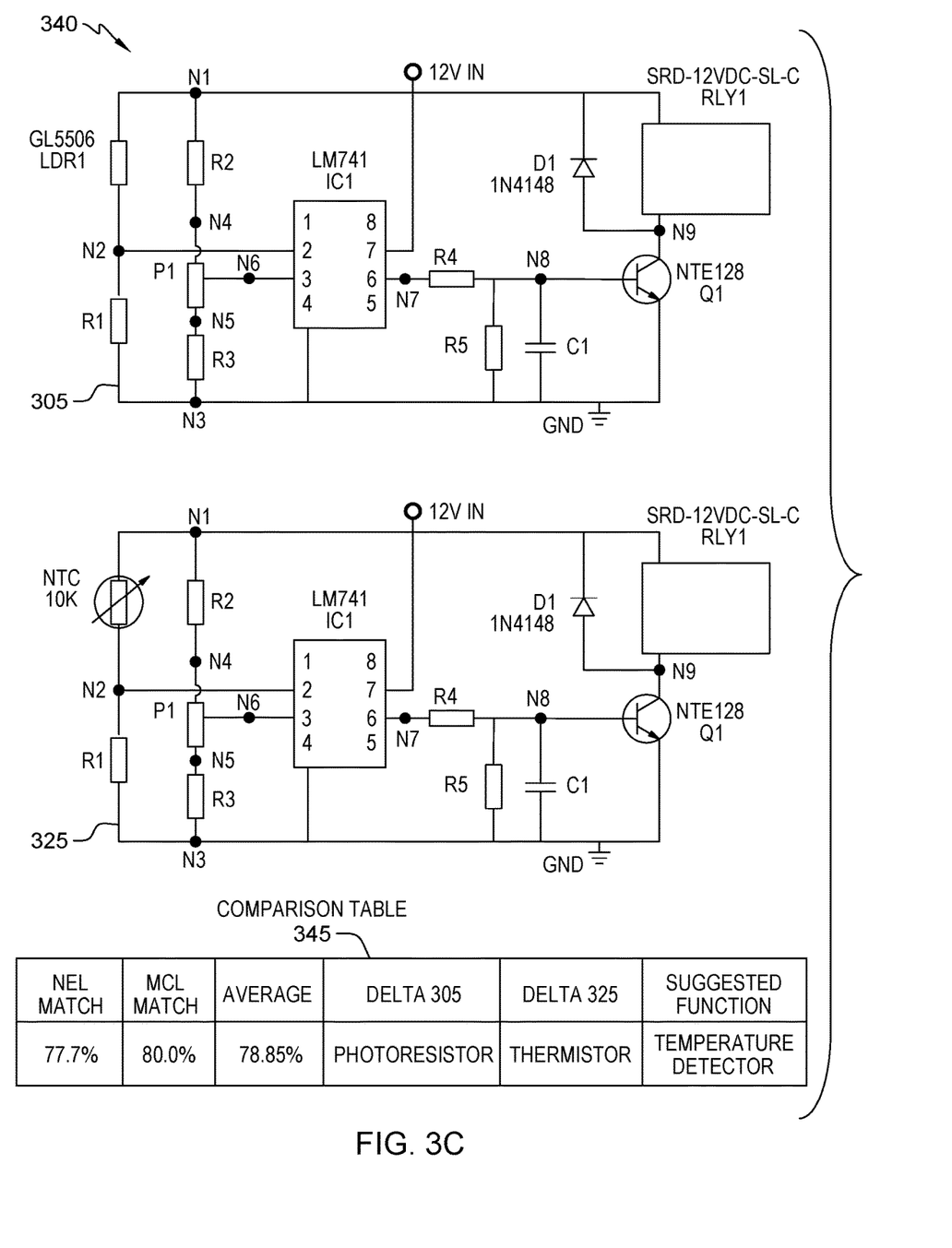
FIG. 3C depicts features of an exemplary comparison between the first and second electrical schematics, in accordance with an embodiment of the present invention.

FIG. 3C depicts an exemplary comparison 340 showing comparison table 345 which includes the NEL and MCL comparison information between schematic 305 in FIG. 3A and schematic 325 in FIG. 3B (the two schematics also included in FIG. 3C). Consider now an example of analyzing unknown schematic 305. Schematic analysis program 138 receives schematic 305 from a user and creates NEL 310. Schematic analysis program 138 compares created NEL 310 with existing NELs stored to a database such as schematic archive database (SADB) 122 on server device as shown in FIG. 1. Schematic analysis program 138 determines that schematic 325 is the nearest match to schematic 305 based on a simple comparison and thus, compares NEL 310 to NEL 330. Schematic analysis program 138 determines that there are seven matching Node Equations and two that do not match. Therefore, as shown in comparison table 345, there is a "77.7%" match between NELs, which does not equal or exceed an example threshold of an "80%" match. Accordingly, schematic analysis program 138 creates MCL 315 (as described above in reference to FIG. 3A). Schematic analysis program 138 again searches SADB 122 for a comparable MCL and determines that MCL 335, associated with schematic 325, is the nearest match based on a simple comparison of MCLs. Schematic analysis program 138 determines that between MCL 315 and MCL 335, there are four matching components and one unique component for each MCL. Thus, as shown in comparison table 345, there is an 80% match in MCLs which equals the 80% example threshold. By retrieving available data from SADB 122, schematic analysis program 138 determines that the unique component in schematic 305 ("GL5506") is a photoresistor while the unique component in schematic 325 ("NTC") is a thermistor (both shown in comparison table 345). Therefore, schematic analysis program 138 is able to suggest that the function of schematic 305 is likely the same as that of schematic 325, that is as a temperature detector as shown in comparison table 345 (based on the inclusion of the thermistor in schematic 325 which is replaced by the photoresistor in schematic 305). In some instances, for example if neither the NEL or the MCL match exceeds a threshold value, a simple average of the closest NEL match and the closest MCL match is determined (as shown in comparison table 345). The NEL best describes how the various components are connected to one another and the MCL best describes which components are connected; thus, the average of the two metrics helps to identify additional, similar schematics from SADB 122 that schematic analysis program 138 can select and provide to the user for additional consideration and comparison with the received schematic.

Figure 4:
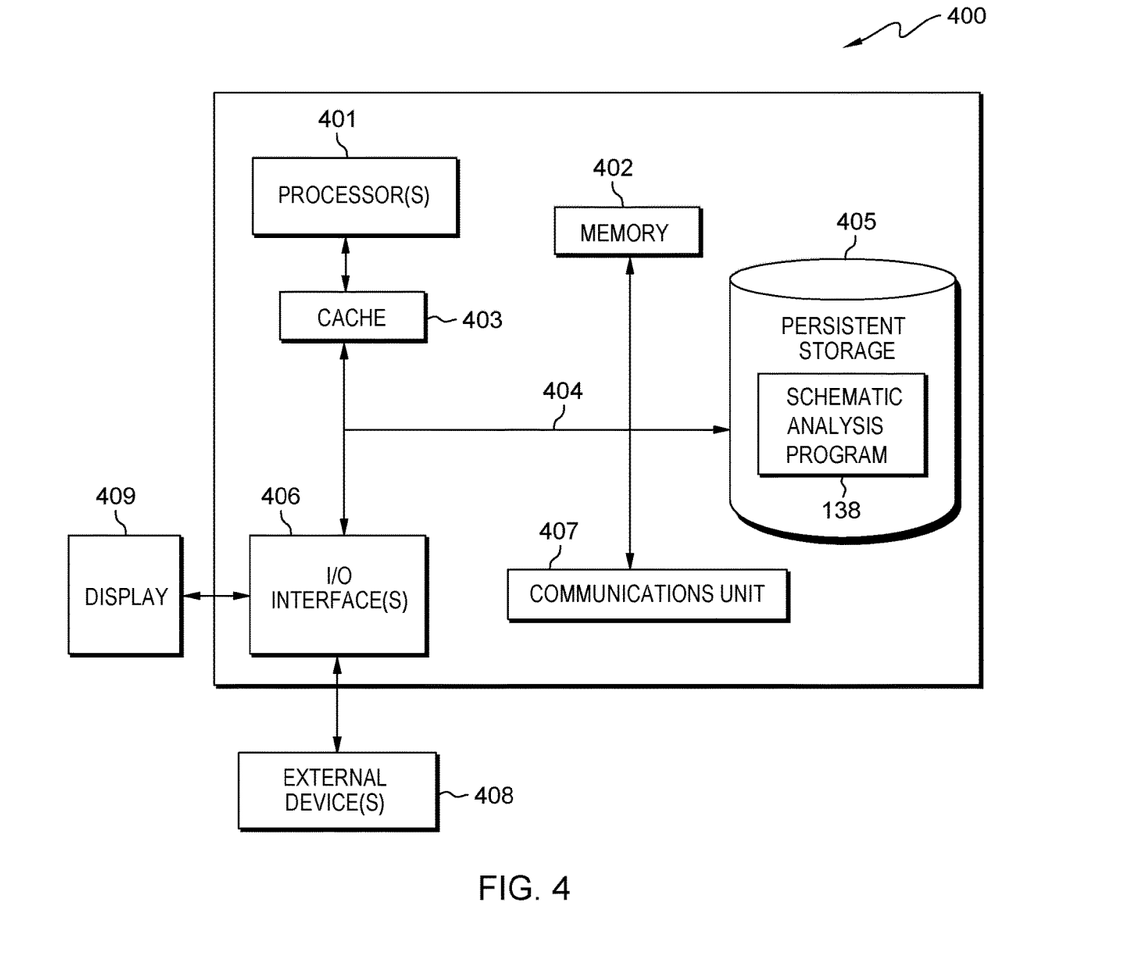
FIG. 4 depicts a block diagram of components of the client device executing the schematic analysis program within the computing environment of FIG. 1, in accordance with an embodiment of the present invention.

FIG. 4 depicts computer system 400, which is an example of a system that includes schematic analysis program 138. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   receiving, by one or more computer processors, a schematic diagram of an electronic circuit with an unknown function;
   responsive to determining that a node equation list associated with the received schematic does not meet a first threshold similarity requirement to a stored node equation list in a database of schematic diagrams of electronic circuits, creating, by one or more computer processors, a main component list associated with the received schematic, wherein:
      each schematic diagram stored in the database of schematic diagrams has a known function, includes an associated node equation list, and includes an associated main component list;
   responsive to determining that the created main component list meets a second threshold requirement for similarity to a stored main component list from the database of schematic diagrams of electronic circuits, retrieving, by one or more computer processors, a node equation list associated with the stored main component list; and
   suggesting, by one or more computer processors, a function of the received schematic based on a function of the retrieved node equation list.

2. The method of claim 1, further comprising:
   responsive to receiving a schematic diagram of an electronic circuit with an unknown function, creating, by one or more computer processors, a node equation list associated with the received schematic; and
   determining, by one or more computer processors, whether the created node equation list meets the first threshold similarity requirement to the stored node equation list from the database of schematic diagrams of electronic circuits.

3. The method of claim 2, wherein the step of determining, by one or more computer processors, whether the created node equation list meets the first threshold similarity requirement to the stored node equation list from the database of schematic diagrams of electronic circuits, comprises:
   identifying, by one or more computer processors, a first set of node function equations associated with the node equation list associated with the received schematic;
   identifying, by one or more computer processors, a second set of node function equations associated with the stored node equation list;
   comparing, by one or more computer processors, the first set of node function equations to the second set of node function equations;
   determining, by one or more computer processors, a percent match between the compared first set of node function equations and second set of node function equations; and
   determining, by one or more computer processors, whether the percent match meets or exceeds the first threshold similarity requirement.

4. The method of claim 3, wherein a first node function equation in the first set of node function equations contains descriptive information of a first node of a plurality of nodes in the received schematic and represents all components connected in common at the first node in the received schematic.

5. The method of claim 1, further comprising:
   responsive to determining that the node equation list associated with the received schematic does meet the first threshold similarity requirement to the stored node equation list from the database of schematic diagrams of electronic circuits, identifying, by one or more computer processors, the function of the received schematic based on a function of the stored node equation list.

6. The method of claim 1, further comprising:
   responsive to determining that the created main component list does not meet the second threshold requirement for similarity to the stored main component list from the database of schematic diagrams of electronic circuits, labelling, by one or more computer processors, the received schematic as new;
   storing, by one or more computer processors, the new schematic; and
   transmitting, by one or more computer processors, at least one recommendation to a user, wherein the at least one recommendation includes one or more improvements to a design and an efficiency of the new schematic based on the stored node equation list that does not meet the first threshold requirement for similarity and the stored main component list that does not meet the second threshold requirement for similarity.

7. The method of claim 1, wherein:
   the node equation list is a description of the received schematic in a machine-readable form and format; and
   the main component list is a listing of primary components, other than resistors and capacitors, identified in the received schematic.

8. A computer program product, the computer program product comprising:
   one or more computer readable storage media; and
   program instructions stored on the one or more computer readable storage media, the program instructions comprising:
      program instructions to receive a schematic diagram of an electronic circuit with an unknown function;
      responsive to determining that a node equation list associated with the received schematic does not meet a first threshold similarity requirement to a stored node equation list in a database of schematic diagrams of electronic circuits, program instructions to create a main component list associated with the received schematic, wherein:
         each schematic diagram stored in the database of schematic diagrams has a known function, includes an associated node equation list, and includes an associated main component list;
      responsive to determining that the created main component list meets a second threshold requirement for similarity to a stored main component list from the database of schematic diagrams of electronic circuits, program instructions to retrieve a node equation list associated with the stored main component list; and
      program instructions to suggest a function of the received schematic based on a function of the retrieved node equation list.

9. The computer program product of claim 8, further comprising program instructions stored on the one or more computer readable storage media, to:
   responsive to receiving a schematic diagram of an electronic circuit with an unknown function, create a node equation list associated with the received schematic; and
   determine whether the created node equation list meets the first threshold similarity requirement to the stored node equation list from the database of schematic diagrams of electronic circuits.

10. The computer program product of claim 9, wherein the program instructions to determine whether the created node equation list meets the first threshold similarity requirement to the stored node equation list from the database of schematic diagrams of electronic circuits, comprise:
program instructions to identify a first set of node function equations associated with the node equation list associated with the received schematic;
program instructions to identify a second set of node function equations associated with the stored node equation list;
program instructions to compare the first set of node function equations to the second set of node function equations;
program instructions to determine a percent match between the compared first set of node function equations and second set of node function equations; and
program instructions to determine whether the percent match meets or exceeds the first threshold similarity requirement.

11. The computer program product of claim 10, wherein a first node function equation in the first set of node function equations contains descriptive information of a first node of a plurality of nodes in the received schematic and represents all components connected in common at the first node in the received schematic.

12. The computer program product of claim 8, further comprising program instructions stored on the one or more computer readable storage media, to:
responsive to determining that the node equation list associated with the received schematic does meet the first threshold similarity requirement to the stored node equation list from the database of schematic diagrams of electronic circuits, identify the function of the received schematic based on a function of the stored node equation list.

13. The computer program product of claim 8, further comprising program instructions stored on the one or more computer readable storage media, to:
responsive to determining that the created main component list does not meet the second threshold requirement for similarity to the stored main component list from the database of schematic diagrams of electronic circuits, label the received schematic as new;
store the new schematic; and
transmit at least one recommendation to a user, wherein the at least one recommendation includes one or more improvements to a design and an efficiency of the new schematic based on the stored node equation list that does not meet the first threshold requirement for similarity and the stored main component list that does not meet the second threshold requirement for similarity.

14. The computer program product of claim 8, wherein:
the node equation list is a description of the received schematic in a machine-readable form and format; and
the main component list is a listing of primary components, other than resistors and capacitors, identified in the received schematic.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to receive a schematic diagram of an electronic circuit with an unknown function;
responsive to determining that a node equation list associated with the received schematic does not meet a first threshold similarity requirement to a stored node equation list in a database of schematic diagrams of electronic circuits, program instructions to create a main component list associated with the received schematic, wherein:
each schematic diagram stored in the database of schematic diagrams has a known function, includes an associated node equation list, and includes an associated main component list;
responsive to determining that the created main component list meets a second threshold requirement for similarity to a stored main component list from the database of schematic diagrams of electronic circuits, program instructions to retrieve a node equation list associated with the stored main component list; and
program instructions to suggest a function of the received schematic based on a function of the retrieved node equation list.

16. The computer system of claim 15, further comprising program instructions stored on the one or more computer readable storage media for execution by at least one of the one or more computer processors, to:
responsive to receiving a schematic diagram of an electronic circuit with an unknown function, create a node equation list associated with the received schematic; and
determine whether the created node equation list meets the first threshold similarity requirement to the stored node equation list from the database of schematic diagrams of electronic circuits.

17. The computer system of claim 16, wherein the program instructions to determine whether the created node equation list meets the first threshold similarity requirement to the stored node equation list from the database of schematic diagrams of electronic circuits, comprise:
program instructions to identify a first set of node function equations associated with the node equation list associated with the received schematic;
program instructions to identify a second set of node function equations associated with the stored node equation list;
program instructions to compare the first set of node function equations to the second set of node function equations;
program instructions to determine a percent match between the compared first set of node function equations and second set of node function equations; and
program instructions to determine whether the percent match meets or exceeds the first threshold similarity requirement.

18. The computer system of claim 17, wherein a first node function equation in the first set of node function equations contains descriptive information of a first node of a plurality of nodes in the received schematic and represents all components connected in common at the first node in the received schematic.

19. The computer system of claim 15, further comprising program instructions stored on the one or more computer readable storage media for execution by at least one of the one or more computer processors, to:
responsive to determining that the node equation list associated with the received schematic does meet the first threshold similarity requirement to the stored node equation list from the database of schematic diagrams of electronic circuits, identify the function of the received schematic based on a function of the stored node equation list.

20. The computer system of claim 15, further comprising program instructions stored on the one or more computer readable storage media for execution by at least one of the one or more computer processors, to:

responsive to determining that the created main component list does not meet the second threshold requirement for similarity to the stored main component list from the database of schematic diagrams of electronic circuits, label the received schematic as new;

store the new schematic; and transmit at least one recommendation to a user, wherein the at least one recommendation includes one or more improvements to a design and an efficiency of the new schematic based on the stored node equation list that does not meet the first threshold requirement for similarity and the stored main component list that does not meet the second threshold requirement for similarity.

* * * * *